United States Patent [19]
Ogiya et al.

[11] Patent Number: 5,666,457
[45] Date of Patent: Sep. 9, 1997

[54] OPTICAL SUBMARINE REPEATER

[75] Inventors: Shuji Ogiya; Michio Kondo, both of Kawasaki; Yasusi Kaeriyama, Sapporo, all of Japan

[73] Assignee: Fujitsu Limited, Kawasaki, Japan

[21] Appl. No.: 699,527

[22] Filed: Aug. 19, 1996

[30] Foreign Application Priority Data

Feb. 14, 1996 [JP] Japan .................. 8-027052

[51] Int. Cl.⁶ .................................................. G02B 6/00
[52] U.S. Cl. ............................................................ 385/139
[58] Field of Search ........................... 385/129, 130, 385/131, 132, 133, 134, 135, 136, 137, 138, 139, 140, 141, 147; 174/70 S, 18, 23 R, 655 S, 76, 77 R, 16.3

[56] References Cited

U.S. PATENT DOCUMENTS

| | | | |
|---|---|---|---|
| 4,029,894 | 6/1977 | Jarvis et al. | 174/70 S |
| 4,217,028 | 8/1980 | Reh et al. | 174/70 S |
| 4,295,707 | 10/1981 | Nakai et al. | 385/101 |
| 4,653,846 | 3/1987 | Yamazaki et al. | 385/138 |
| 4,962,445 | 10/1990 | Pelet et al. | 385/92 |
| 5,319,732 | 6/1994 | Jones | 385/135 |

*Primary Examiner*—Akm E. Ullah
*Attorney, Agent, or Firm*—Staas & Halsey

[57] ABSTRACT

A circuit unit including heating components is accommodated in a space defined by a cylindrical metal case and a pair of case end plates closing the opposite ends of the metal case. The metal case is accommodated in an insulated space defined by a PE cylinder formed of insulating resin such as polyethylene and a pair of PE end plates closing the opposite ends of the PE cylinder. The PE cylinder is accommodated in a pressure-resistant housing through a first radiating/cushioning member. A radiating disk biased by a second radiating/cushioning member is kept in pressure contact with each PE end plate kept in close contact with the corresponding case end plate.

8 Claims, 6 Drawing Sheets

OPTICAL SUBMARINE REPEATER

BACKGROUND OF THE INVENTION

1. Field of the Invention

The present invention relates to an optical submarine repeater, and more particularly to a technique for improving radiation characteristics and voltage-resistant characteristics of an optical submarine repeater.

2. Description of the Related Art

In an optical submarine cable transmission system adopting an optical fiber cable whose transmission capacity is larger than that of a coaxial cable, optical submarine repeaters are provided at suitable intervals in order to amplify attenuated optical signals and prevent degradation of transmitted signals. In such an optical submarine repeater, it is desired to improve the radiation characteristics in response to an increase in heating value due to recent high-density mounting or the like. Further, it is also necessary to improve the voltage-resistant characteristics.

A conventional optical submarine repeater is composed generally of a substantially cylindrical pressure-resistant housing for protecting the interior of the repeater from the seawater pressure and a plurality of circuit units including feeding circuit units and amplifying circuit units. The pressure-resistant housing has a pair of cable retaining portions for introducing optical submarine cables at the opposite ends.

The circuit units are accommodated in a substantially cylindrical metal case closed at its opposite ends through a connecting bar for positioning and fixing the circuit units. The metal case is accommodated in a substantially cylindrical PE cylinder formed of polyethylene resin or the like, closed at its opposite ends, in order to improve the voltage-resistant characteristics. The PE cylinder is accommodated in the pressure-resistant housing through a radiating/cushioning member for radiation and cushioning purposes. The PE cylinder accommodating the metal case is sandwiched by a pair of substantially annular radiating/cushioning members, thereby being fixed to the pressure-resistant housing. The optical submarine cable is introduced from an end of the cable retaining portion of the pressure-resistant housing. An optical fiber cable and a feeder cable are passed through through-holes formed through an end plate of the PE cylinder and an end plate of the metal case, and are connected to the corresponding circuit units.

As an amplifying system for such an optical submarine repeater, a 3R repeating system has conventionally been adopted. In the 3R repeating system, an electrical signal converted from an optical signal is subjected to Reshaping, Retiming, and Regeneration, and is then reconverted into an optical signal. Recently, however, an optical direct amplification system using an erbium-doped fiber or the like has increasingly been adopted.

In association with the shift to such an optical direct amplification system, high-density mounting has proceeded to result in an increase in heating value per unit volume in the optical submarine repeater as mentioned above. Further, a distance between neighboring repeaters becomes shorter, so that in the case where the repeaters are laid on a shallow seabed, the radiation of heat from the repeaters is reduced because of a relatively high seawater temperature at the shallow seabed. In a WDM (Wavelength Division Multiplexing) system under consideration for future adoption, a further increase in heating value is expected. Accordingly, sufficient radiation measures must be taken.

While the optical submarine repeater is operated by the supply of given electric power through a feeder cable, there is a possibility that a large potential difference (e.g., several kilovolts) between the pressure-resistant housing and the circuit units contained therein may be generated in the event of abnormality in a feeding path. Accordingly, the voltage-resistant characteristics must also be improved.

SUMMARY OF THE INVENTION

It is therefore an object of the present invention to improve the radiation characteristics.

It is another object of the present invention to improve the voltage-resistant characteristics.

In accordance with an aspect of the present invention, there is provided an optical submarine repeater having a circuit unit, comprising a substantially cylindrical, pressure-resistant housing formed of metal; a substantially cylindrical, first radiating/cushioning member formed of elastic metal, an outer circumferential surface of the first radiating/cushioning member being kept in close contact with an inner circumferential surface of the pressure-resistant housing; a substantially cylindrical, first insulating member formed of insulating resin, an outer circumferential surface of the first insulating member being kept in close contact with an inner circumferential surface of the first radiating/cushioning member; a substantially cylindrical, first case member formed of metal, an outer circumferential surface of the first case member being kept in close contact with an inner circumferential surface of the first insulating member; a second case member formed of metal, the second case member being fixed to the first case member at an end portion thereof in an axial direction of the housing, whereby a space for accommodating the circuit unit is defined by the first case member and the second case member; a second insulating member formed of insulating resin, the second insulating member being fixed to the first insulating member at an end portion thereof in the axial direction of the housing, an inner surface of the second insulating member in the axial direction of the housing being kept in close contact with an outer surface of the second case member in the axial direction of the housing, whereby an insulated space is defined by the first insulating member and the second insulating member; and a substantially circular radiating disk member, an inner surface of the radiating disk member in the axial direction of the housing being kept in close contact with an outer surface of the second insulating member in the axial direction of the housing, an outer circumferential surface of the radiating disk member being kept in close contact with the inner circumferential surface of the pressure-resistant housing.

According to the present invention, the radiating disk member is provided. Accordingly, in addition to the operation that heat generated from the circuit unit is transferred through the first case member, the first insulating member, and the first radiating/cushioning member to the pressure-resistant housing, the heat is also transferred through the second case member, the second insulating member, and the radiating disk member to the pressure-resistant housing. Then, the heat is totally radiated from the pressure-resistant housing to the surroundings (sea). Accordingly, the radiating characteristics can be improved.

Preferably, the second insulating member has a substantially cylindrical shape such that one end thereof is closed and the other end is open, and the second insulating member is fixed by welding to the first insulating member in a condition that the closed end of the second insulating member is positioned outside in the axial direction of the housing and the open end of the second insulating member is inserted in the first insulating member. With this configuration, the path of a joint portion between the first insulating member and the second insulating member can be elongated to thereby improve the voltage-resistant characteristics.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

First Preferred Embodiment

Figure 1:
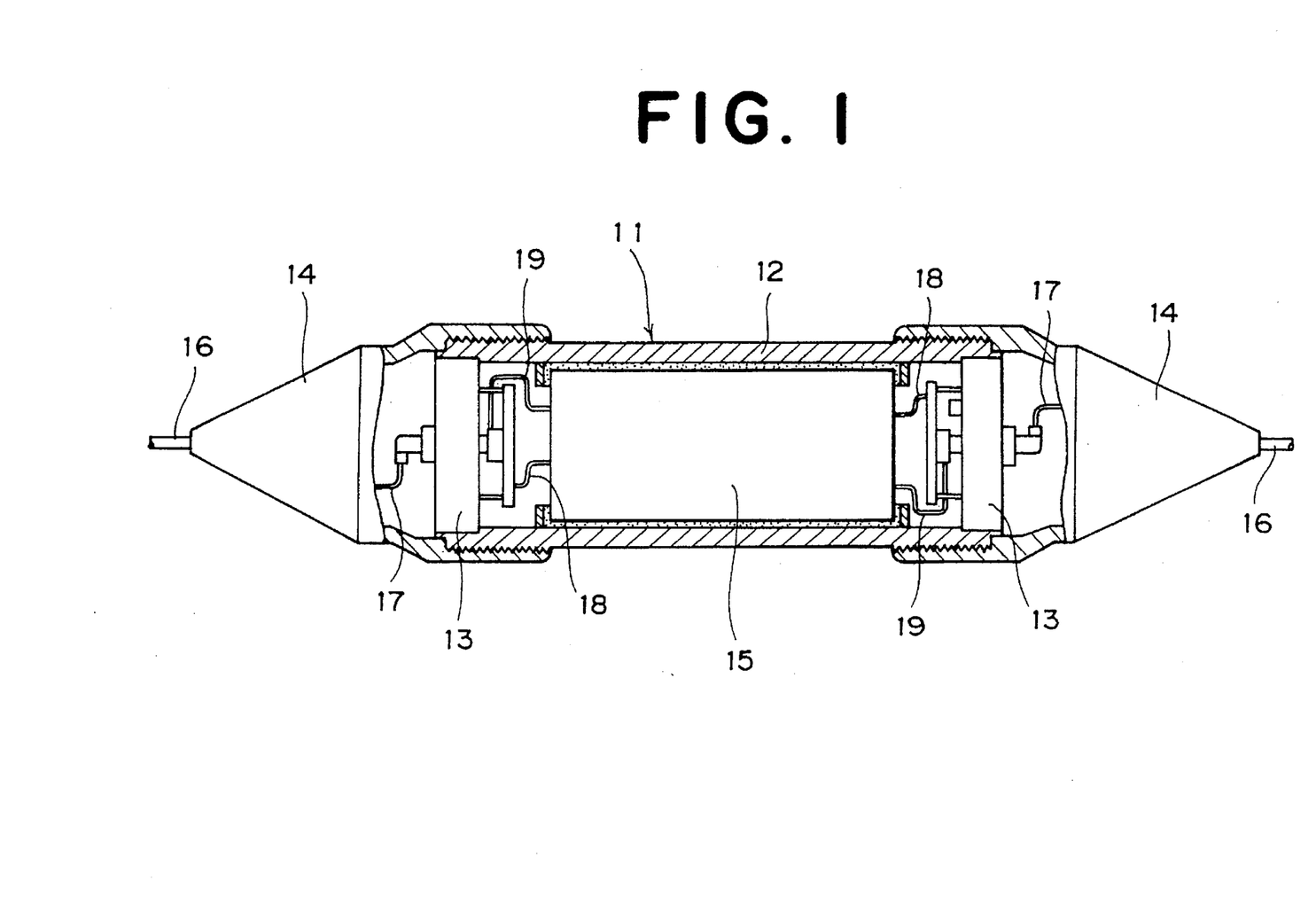
FIG. 1 is a sectional view showing a general configuration of an optical direct amplification submarine repeater according to a first preferred embodiment of the present invention.

Referring to FIG. 1, reference numeral 11 denotes a pressure resistant housing for protecting the interior of a repeater from the seawater. The pressure-resistant housing 11 is composed of a substantially cylindrical housing body 12 formed of metal, a pair of housing end plates 13 fixed by welding to the opposite open ends of the housing body 12 so as to close the opposite open ends of the housing body 12, and a pair of cable retaining members 14 threadedly engaged with the opposite end portions of the housing body 12. A repeater unit 15 is accommodated in the pressure-resistant housing 11. Reference numerals 16, 17, 18, and 19 denote optical submarine cables, tail cables, optical fiber cables, and feeder cables, respectively.

Figure 2:
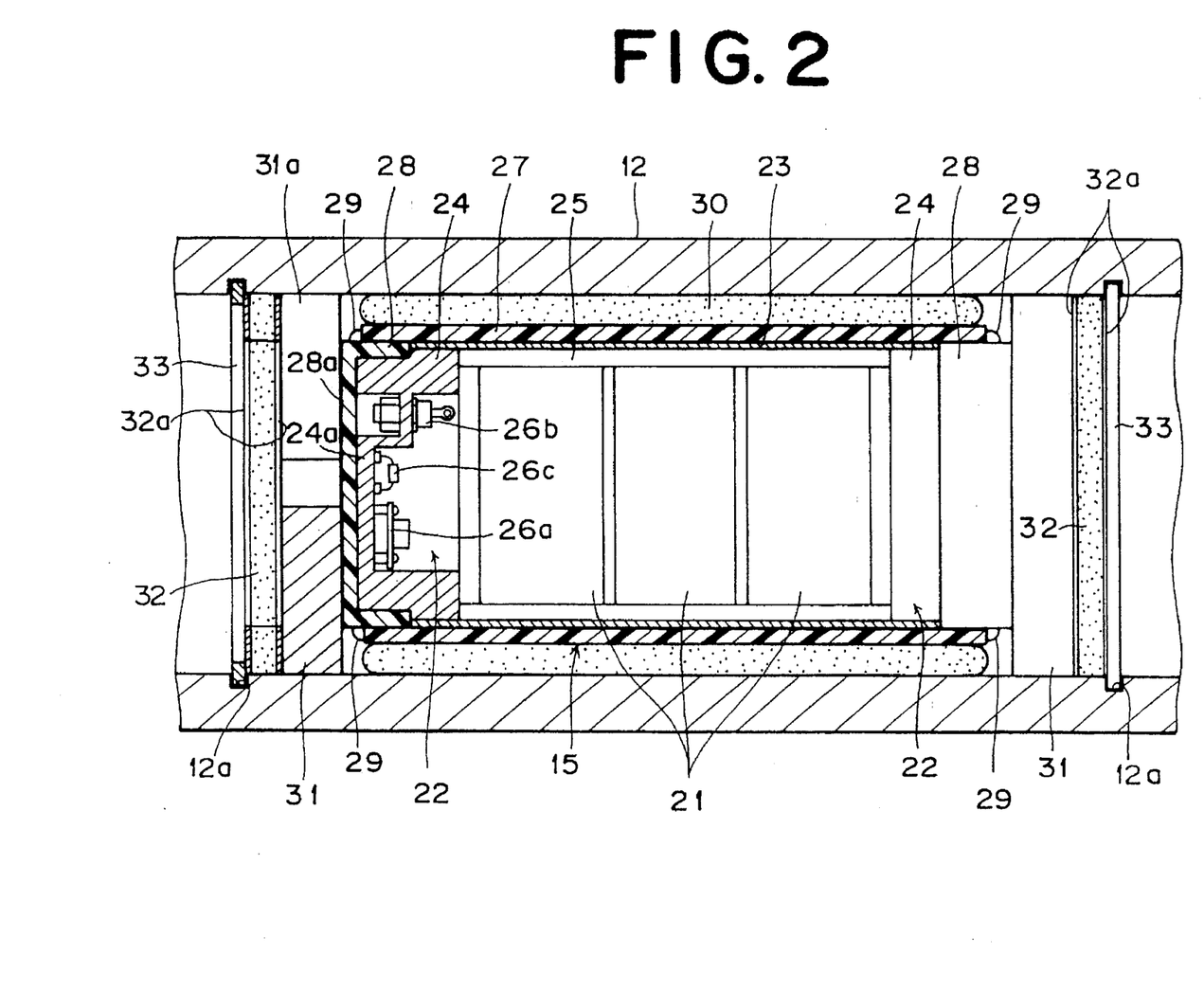
FIG. 2 is a sectional view showing a configuration of an essential part of the optical direct amplification submarine repeater shown in FIG. 1, taken along a plane containing the axis of a housing of the repeater.
Figure 3:
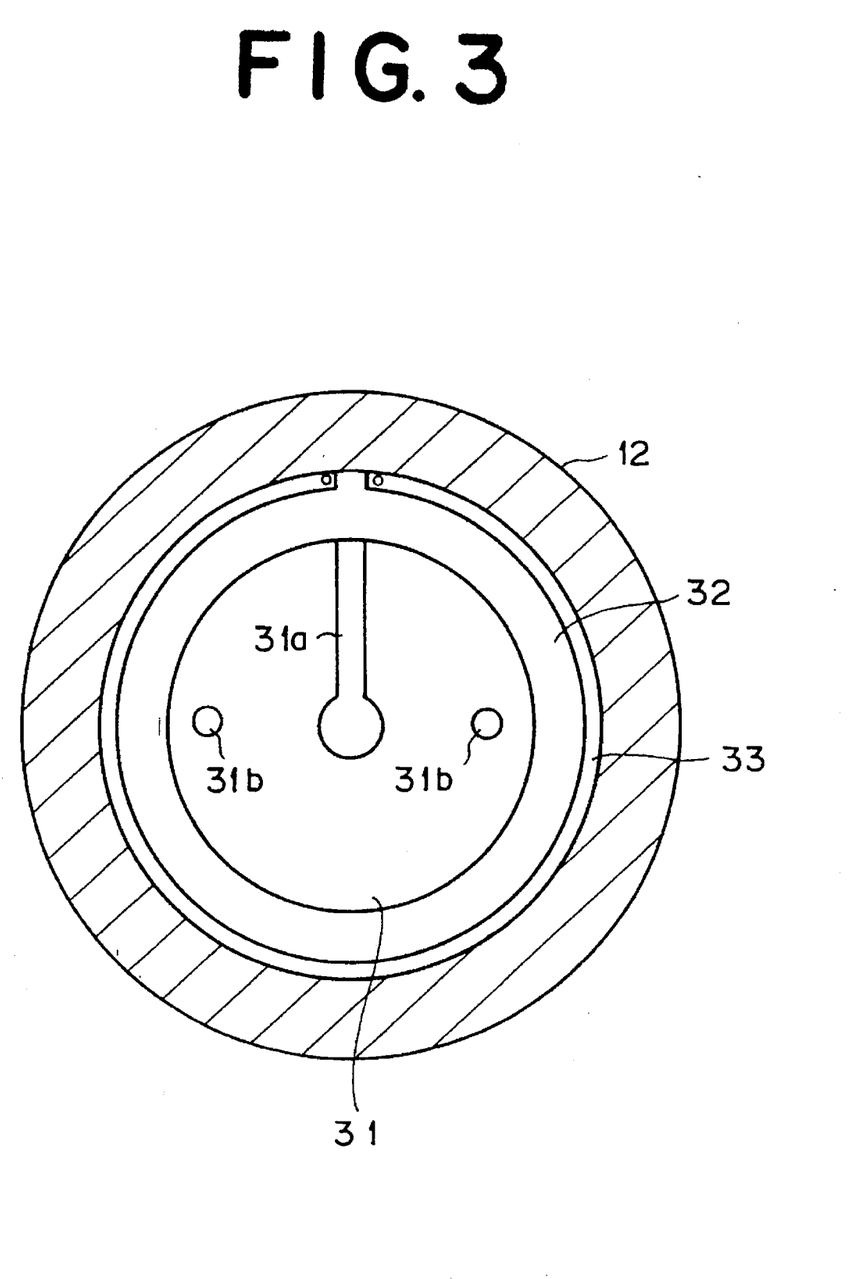
FIG. 3 is a sectional view showing a configuration of an essential part of the optical direct amplification submarine repeater shown in FIG. 1, taken along a plane perpendicular to the axis of housing.

Referring to FIGS. 2 and 3, reference numerals 21 denote a plurality of (three in this preferred embodiment) system sections (amplifying circuit unit), and reference numerals 22 denote a pair of feeding circuit sections (feeding circuit unit). Reference numeral 23 denotes a substantially cylindrical metal case (first case member), and reference numerals 24 denote a pair of case end plates (second case member). The plural system sections 21 are positioned and fixed in the metal case 23 through a connecting bar 25.

Each case end plate 24 has a substantially cylindrical shape such that one end thereof is closed by a bottom portion 24a and the other end is open. A cylindrical portion of the case end plate 24 is composed of a small-diameter portion on the bottom portion 24a side and a large-diameter portion on the open end side, which is larger in diameter than the small-diameter portion. The outer diameter of the large-diameter portion of the case end plate 24 is set to substantially the same as or slightly smaller than the inner diameter of the metal case 23. Each case end plate 24 is fixed to the metal case 23 in the condition that the large-diameter portion of the case end plate 24 is inserted in the metal case 23. A printed wiring board 26a on which various components are mounted, a Zener diode 26b, a resistor 26c, etc. constituting each feeding circuit section 22 are directly mounted on each case end plate 24 through an insulating member or the like.

Reference numeral 27 denotes a substantially cylindrical PE cylinder (first insulating member) formed of an insulating material such as polyethylene, and reference numerals 28 denote a pair of PE end plates (second insulating member) formed of an insulating material such as polyethylene. The inner diameter of the PE cylinder 27 is set to substantially the same as or slightly larger than the outer diameter of the metal case 23, so that the inner surface of the PE cylinder 27 is in close contact with the outer surface of the metal case 23. Each PE end plate 28 has a substantially cylindrical shape such that one end thereof is closed by a bottom portion 28a and the other end is open. The outer diameter of the PE end plate 28 is set to substantially the same as or slightly smaller than the inner diameter of the PE cylinder 27. The inner diameter of the PE end plate 28 is set to substantially the same as or slightly larger than the outer diameter of the small-diameter portion of the case end plate 24. Each PE end plate 28 is hermetically fixed to the PE cylinder 27 by welding at 29 in the condition that the small-diameter portion of each case end plate 24 is inserted in the PE end plate 28, and the open end portion of the PE end plate 28 is inserted in the PE cylinder 27.

In this manner, the circuit units 21 and 22 of different kinds are accommodated in a space defined by the metal case 23 and the case end plates 24, and this assembly is accommodated in an insulated space defined by the PE cylinder 27 and the PE end plates 28, thereby constructing the repeater unit 15. According to this structure, a joint portion between the PE cylinder 27 and each PE end plate 28 has an elongated path to obtain a voltage-resistant double structure, thereby improving the voltage-resistant characteristics.

The repeater unit 15 is accommodated in the pressure-resistant housing 11 through a substantially cylindrical, radial radiating/cushioning member (first radiating/cushioning member) 30. The radial radiating/cushioning member 30 is formed, for example, by weaving a wire having elasticity like a mesh or by corrugating a sheet metal having elasticity. The radial radiating/cushioning member 30 functions to both transfer heat generated from the repeater unit 15 to the pressure-resistant housing 11 and absorb a shock subjected to the repeater unit 15.

A pair of radiating disks (radiating disk member) 31 are provided outside of the PE end plates 28 in a housing axial direction (in a direction along the center axis of the pressure-resistant housing 11) (i.e., opposite to the repeater unit 15 with respect to the PE end plates 28). Each radiating disk 31 is a substantially circular member having elasticity, formed of metal having a good conductivity such as copper. The radiating disk 31 has a slit 31a radiating extending from the center to the outer circumference, and also has a pair of through-holes 31b for introducing the cables 18 and 19. The radiating disk 31 is inserted in the housing body 12 of the pressure-resistant housing 11 in the condition that the disk 31 is elastically deformed so as to reduce the width of the slit 31a (i.e., in the condition that an initial load is applied to the disk 31), so that the disk 31 is kept in pressure contact with the inner surface of the housing body 12 by its own restoring force.

Further, a pair of substantially annular, axial radiating/cushioning members (second radiating/cushioning member) 32 are provided outside of the radiating disks 31 in the housing axial direction in such a manner as to bias the radiating disks 31 inward in the housing axial direction (i.e., toward the respective PE end plates 28). Each axial radiating/cushioning member 32 is composed of a member formed, for example, by weaving a wire having elasticity like a mesh or by corrugating a sheet metal having elasticity, and a pair of annular plates 32a sandwiching this member. A pair of stop rings 33 are engaged with a pair of annular grooves 12a formed on the inner surface of the housing body 12 at positions just outside of the axial radiating/cushioning members 32 in the housing axial direction, thereby fixing the axial radiating/cushioning members 32 in the condition that an initial load is applied thereto inward in the housing axial direction. Accordingly, the axial radiating/cushioning members 32 are kept in pressure contact with the respective radiating disks 31, which are in turn kept in pressure contact with the respective PE end plates 28. The axial radiating/cushioning members 32 function to both absorb a shock subjected to the repeater unit 15 and transfer heat generated from the repeater unit 15 to the pressure-resistant housing 11.

Figure 4:
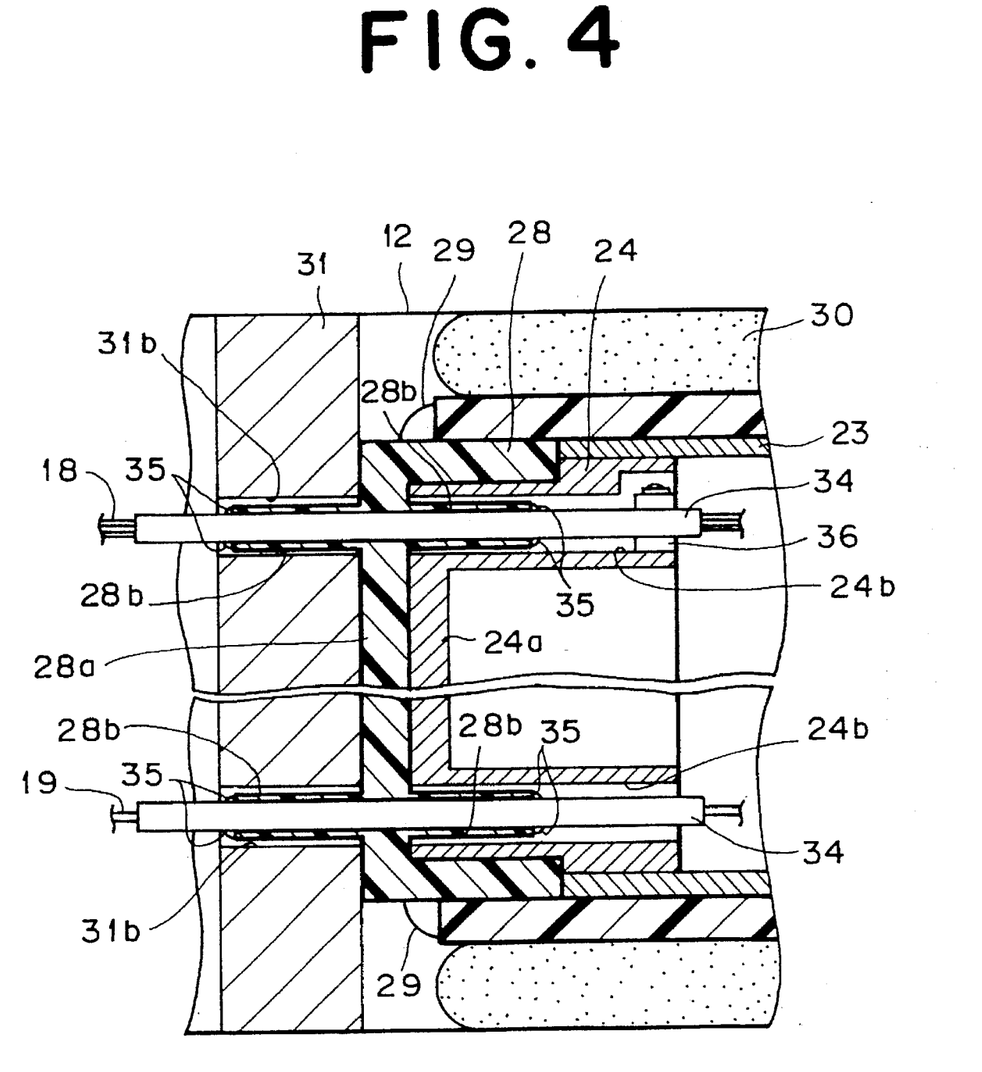
FIG. 4 is an enlarged sectional view of a part shown in FIG. 2.

FIG. 4 is an enlarged view of a cable introducing portion of the repeater shown in FIG. 2. The cylindrical portion of the case end plate 24 is formed with a pair of through-holes 24b for introducing the cables 18 and 19. The pair of through-holes 24b of the case end plate 24 extend in a direction substantially parallel to the housing axial direction, and are positioned so as to respectively align with the pair of through-holes 31b of the radiating disk 31. The bottom portion 28a of the PE end plate 28 is integrally formed with a pair of cable insert portions 28b extending in a direction substantially parallel to the housing axial direction and projecting from the inner and outer surfaces of the bottom portion 28a. The cable insert portions 28b have through-holes through which the cables 18 and 19 are passed, and are positioned so as to align with the through-holes 24b and 31b. A pair of PE tubes 34 formed of an insulating resin such as polyethylene are inserted through the pair of cable insert portions 28b, and are fixed to the cable insert portions 28b at their opposite ends by welding at 35. One of the PE tubes 34 is fixedly supported to the case end plate 24 by a PE tube holder 36. According to this structure, a joint portion between each PE tube 34 and the corresponding cable insert portion 28b has an elongated path to obtain a voltage-resistant double structure, thereby improving the voltage-resistant characteristics. The optical fiber cable 18 and the feeder cable 19 are passed through the respective PE tubes 34, and are introduced into the repeater unit 15.

According to the first preferred embodiment, heat generated from the system sections 21 is transferred through the metal case 23, the PE cylinder 27, and the radial radiating/cushioning member 30 to the pressure-resistant housing 11, and is then radiated from the pressure-resistant housing 11 to the sea. In addition, since the radiating disks 31 are kept in pressure contact with the PE end plates 28, heat generated from the feeding circuit sections 22 is transferred through the case end plates 24, the PE end plates 28, and the radiating disks 31 to the pressure-resistant housing 11, and is then radiated from the pressure-resistant housing 11 to the sea.

Accordingly, the radiation efficiency is high. Further, various components including the printed wiring board 26a, the Zener diode 26b, and the resistor 26c constituting each feeding circuit section 22 are directly mounted on the corresponding case end plate 24; the outer surface of the bottom portion 24a of each case end plate 24 is in close contact with the inner surface of the bottom portion 28a of the corresponding PE end plate 28; and the outer surface of the bottom portion 28a of each PE end plate 28 is in close contact with the corresponding radiating disk 31. With this structure, heat from these components 26a, 26b, and 26c can be transferred to the pressure-resistant housing 11 with a high efficiency. Further, since each PE end plate 28 is formed in a cup-shape (cylindrical shape with a closed bottom) to give an elongated path of the joint portion between the PE end plate 28 and the PE cylinder 27, the voltage-resistant characteristics can be improved. Further, each PE end plate 28 is integrally formed with the cable insert portion 28b for passing the PE tube 34 therethrough, and the optical fiber cable 18 and the feeder cable 19 are inserted through the PE tube 34, so as to give an elongated path of the joint portion between the PE tube 34 and the PE end plate 28. Accordingly, the voltage-resistant characteristics can be improved.

Second Preferred Embodiment

Figure 5:
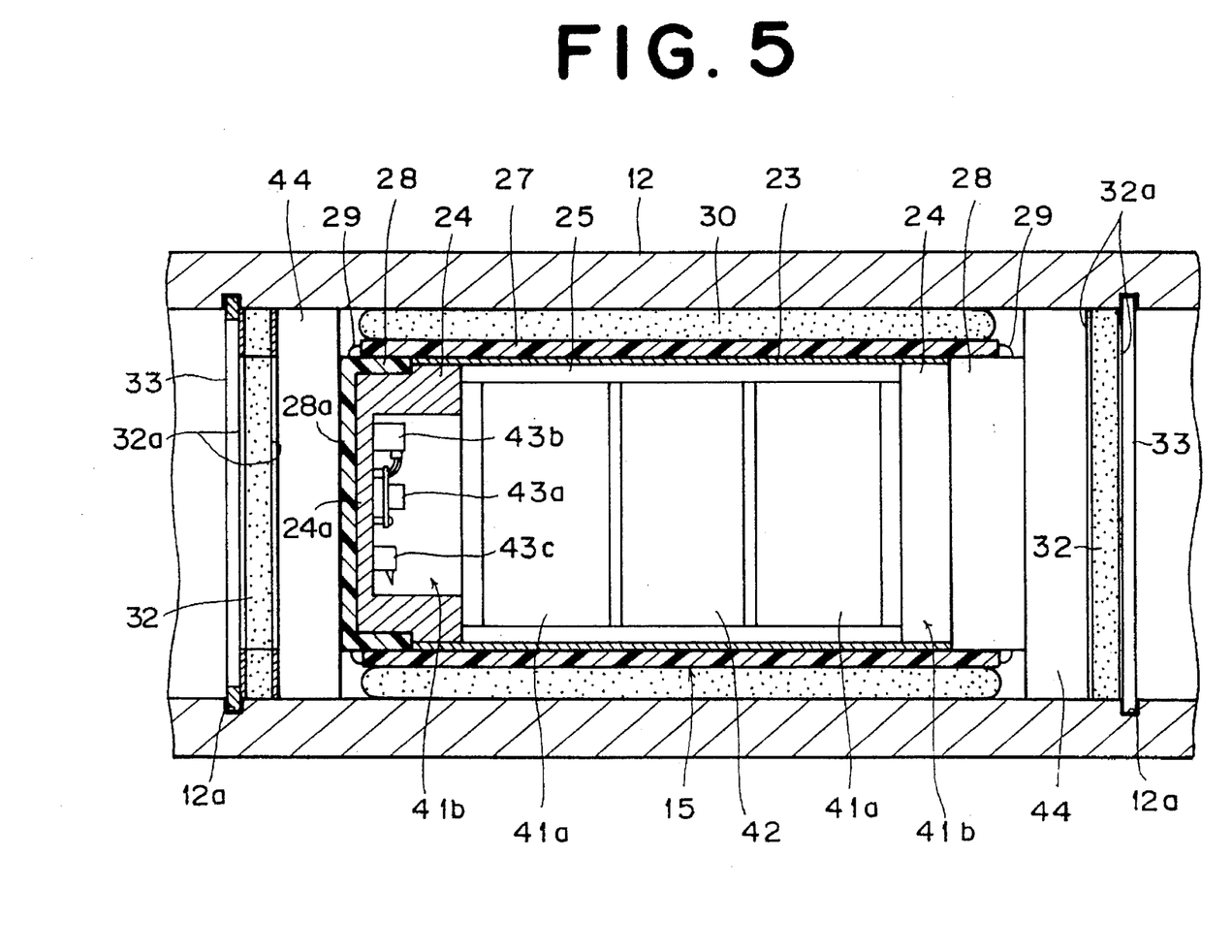
FIG. 5 is a sectional view showing a configuration of an essential part of an optical direct amplification submarine repeater according to a second preferred embodiment of the present invention, taken along a plane containing the axis of a housing of the repeater.

In this preferred embodiment, substantially the same parts as those in the first preferred embodiment shown in FIGS. 1 to 4 are denoted by the same reference numerals, and only different parts will be described. In the first preferred embodiment mentioned above, the three system sections 21 are located at a relatively central position in the space defined by the metal case 23 and the case end plates 24, and the components 26a, 26b, and 26c constituting each feeding circuit section 22 are mounted on the corresponding case end plate 24. In contrast, the second preferred embodiment has a configuration that the location of the system sections and the feeding circuit sections has been modified as shown in FIG. 5.

More specifically, the system sections are classified into a pair of optical circuit sections 41a and a pair of LD (laser diode) drive circuit sections 41b. A feeding circuit section 42 is located at a relatively central position in the space defined by a metal case 23 and a pair of case end plates 24. The pair of optical circuit sections 41a are located on the opposite sides of the feeding circuit section 42, and the pair of LD drive circuit sections 41b are located outside of the pair of optical circuit sections 41a in the housing axial direction. A printed wiring board 43a on which various components are mounted, a power transistor 43b, a laser diode (LD) 43c, etc. constituting each LD drive circuit section 41b are directly mounted on the inner surface of a bottom portion 24a of the corresponding case end plate 24. Heat generated from the LD drive circuit sections 41b is transferred through the case end plates 24, PE end plates 28, and radiating disks 44 to a housing body 12 of a pressure-resistant housing 11 with a high efficiency, and is then radiated from the pressure-resistant housing 11 to the sea. Accordingly, the LD drive circuit sections 41b having a relatively high heating value can be cooled with a high efficiency, thereby maintaining good characteristics.

Figure 6:
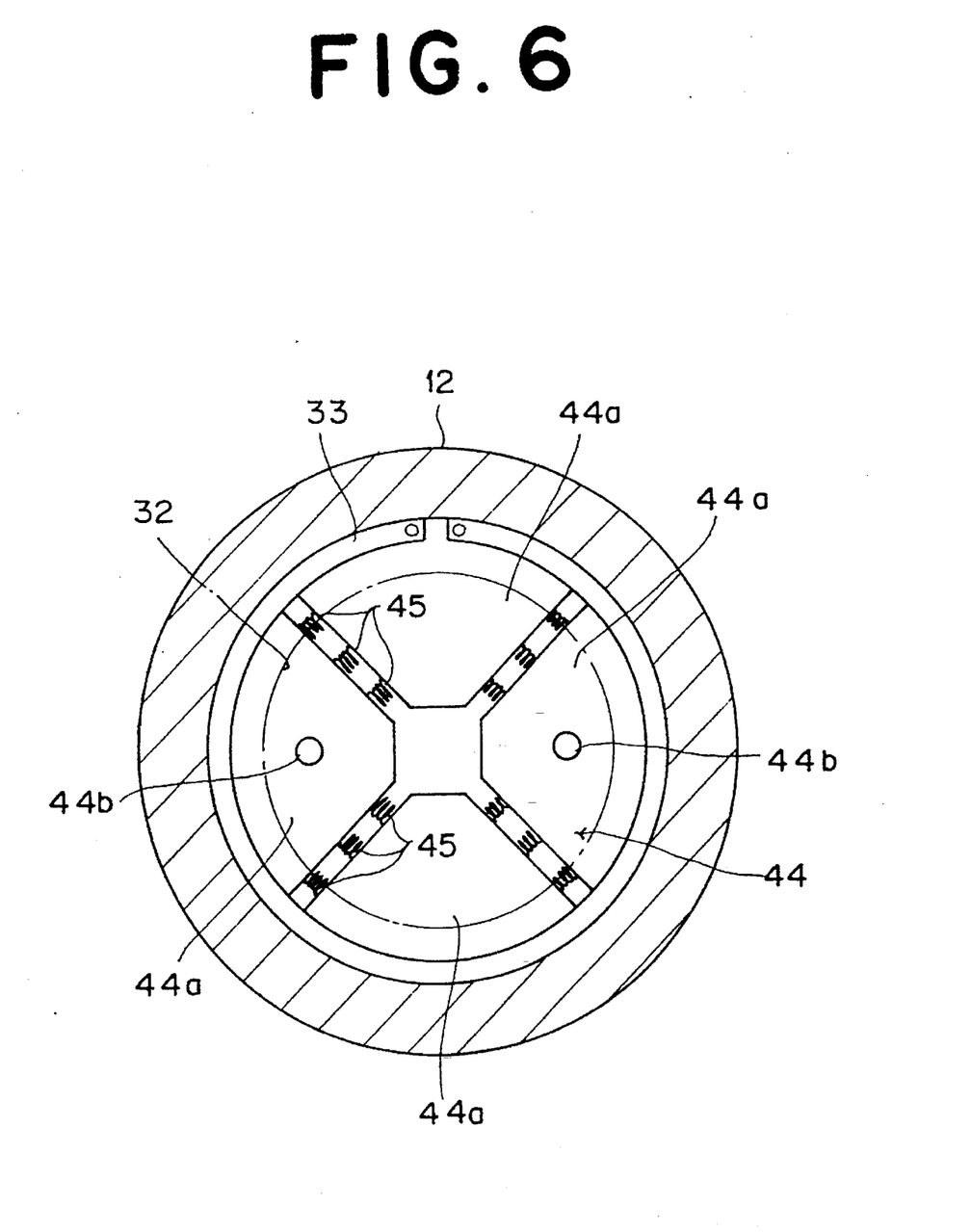
FIG. 6 is a sectional view showing a configuration of an essential part of the optical direct amplification submarine repeater shown in FIG. 5, taken along a plane perpendicular to the axis of a housing of the repeater.

In contrast with the first preferred embodiment employing the radiating disks 31 each having the slit 31a, the radiating disks 44 in the second preferred embodiment have a configuration as shown in FIG. 6. More specifically, each radiating disk 44 is composed of a plurality of disk components 44a and a plurality of biasing members (e.g., rubber members or springs) 45 connecting the plural disk components 44a. The plural disk components 44a have a form such that a disk having a central rectangular through-hole is divided into a plurality of equal parts by lines passing the center of the disk (four equal parts at a dividing angle of 90 degrees in this preferred embodiment). Each disk component 44a is formed of ceramic superior in heat conductivity. In the condition where no external force is applied to the radiating disk 44, the outer diameter of the radiating disk 44 is greater than the inner diameter of the housing body 12 by the operation of the biasing members 45. In inserting the radiating disk 44 into the housing 12, an external force is applied to the radiating disk 44 to reduce the outer diameter of the radiating disk 44 and thereby deform it against biasing forces of the biasing members 45. After the insertion of the radiating disk 44 into the housing body 12, the external force is removed to make the radiating disk 44 come to pressure contact with the inner surface of the housing body 12. In FIG. 6, reference numerals 44b denote a pair of through-holes for introducing cables.

What is claimed is:

1. An optical submarine repeater having a circuit unit, comprising:

a substantially cylindrical, pressure-resistant housing formed of metal;

a substantially cylindrical, first radiating/cushioning member formed of elastic metal, an outer circumferential surface of said first radiating/cushioning member being kept in close contact with an inner circumferential surface of said pressure-resistant housing;

a substantially cylindrical, first insulating member formed of insulating resin, an outer circumferential surface of said first insulating member being kept in close contact with an inner circumferential surface of said first radiating/cushioning member;

a substantially cylindrical, first case member formed of metal, an outer circumferential surface of said first case member being kept in close contact with an inner circumferential surface of said first insulating member;

a second case member formed of metal, said second case member being fixed to said first case member at an end portion thereof in an axial direction of said housing, whereby a space for accommodating said circuit unit is defined by said first case member and said second case member;

a second insulating member formed of insulating resin, said second insulating member being fixed to said first insulating member at an end portion thereof in the axial direction of said housing, an inner surface of said second insulating member in the axial direction of said housing being kept in close contact with an outer surface of said second case member in the axial direction of said housing, whereby an insulated space is defined by said first insulating member and said second insulating member; and a substantially circular radiating disk member, an inner surface of said radiating disk member in the axial direction of said housing being kept in close contact with an outer surface of said second insulating member in the axial direction of said housing, an outer circumferential surface of said radiating disk member being kept in close contact with the inner circumferential surface of said pressure-resistant housing.

2. An optical submarine repeater according to claim 1, wherein said second insulating member has a substantially cylindrical shape such that one end thereof is closed and the other end is open, and said second insulating member is fixed by welding to said first insulating member in a condition that said closed end of said second insulating member is positioned outside in the axial direction of said housing and said open end of said second insulating member is inserted in said first insulating member.

3. An optical submarine repeater according to claim 2, wherein said second case member has a substantially cylindrical shape such that one end thereof is closed and the other end is open, and that an outer cylindrical surface of said second case member is composed of a small-diameter portion formed on said closed end side and a large-diameter portion formed on said open end side, said large-diameter portion being inserted in said first case member, said small-diameter portion being inserted in said second insulating member.

4. An optical submarine repeater according to claim 3, wherein:

said second insulating member is integrally formed with a substantially cylindrical cable insert portion projecting in a direction substantially parallel to the axial direction of said housing and having a through-hole extending in the direction substantially parallel to the axial direction of said housing; and said optical submarine repeater further comprises a tube member formed of insulating resin, said tube member being inserted through said through-hole of said cable insert portion of said second insulating member and fixed by welding to opposite ends of said cable insert portion of said second insulating member.

5. An optical submarine repeater according to claim 3, wherein a part of circuit components constituting said circuit unit is directly mounted on said second case member.

6. An optical submarine repeater according to claim 1, further comprising:

a substantially cylindrical, second radiating/cushioning member formed of elastic metal, said second radiating/cushioning member being provided outside of said radiating disk member in the axial direction of said housing so as to bias said radiating disk member inward in the axial direction of said housing.

7. An optical submarine repeater according to claim 6, wherein said radiating disk member has a slit radially extending from a center of said radiating disk member to an outer circumference thereof, an outer circumferential surface of said radiating disk member being kept in pressure contact with the inner circumferential surface of said pressure-resistant housing in a condition that said radiating disk member is elastically deformed so as to reduce a width of said slit.

8. An optical submarine repeater according to claim 6, wherein said radiating disk member comprises a plurality of disk components and a plurality of biasing members for connecting said disk components and biasing said disk components so as to increase an outer diameter of said radiating disk member in a condition that no external force is applied to said radiating disk member, said disk components having a form such that a disk having central through-hole is divided into a plurality of parts by lines passing a center of said disk, an outer circumferential surface of said radiating disk member being kept in pressure contact with the inner circumferential surface of said pressure-resistant housing in a condition that said radiating disk member is elastically deformed against biasing forces of said biasing members so as to reduce the outer diameter of said radiating disk member.

* * * * *

UNITED STATES PATENT AND TRADEMARK OFFICE
CERTIFICATE OF CORRECTION

PATENT NO. : 5,666,457
DATED : September 9, 1997
INVENTOR(S) : Shuji OGIYA, et al.

It is certified that error appears in the above-indentified patent and that said Letters Patent is hereby corrected as shown below:

Item [57] - Abstract - line 12, after "plate." insert --The radiating disk is also kept in pressure contact with the inner surface of the pressure-resistant housing. Heat generated from the circuit unit is transferred through the case end plates, the PE end plates, and the radiating disks to the pressure-resistant housing with a high efficiency, and is then radiated to the sea. The heating components may be mounted on each case end plate. Each PE end plate has a cylindrical shape with a closed end, and this PE end plate is inserted in the PE cylinder and fixed by welding thereto, thereby giving an elongated path of a joint portion between the PE end plate and the PE cylinder to improve the voltage-resistant characteristics.--

Signed and Sealed this

Ninth Day of December, 1997

*Attest:*

BRUCE LEHMAN

*Attesting Officer*  Commissioner of Patents and Trademarks